(12) United States Patent
Batchelder et al.

(10) Patent No.: US 9,688,027 B2
(45) Date of Patent: Jun. 27, 2017

(54) ELECTROPHOTOGRAPHY-BASED ADDITIVE MANUFACTURING WITH OVERLAY CONTROL

(71) Applicant: Stratasys, Inc., Eden Prairie, MA (US)

(72) Inventors: J. Samuel Batchelder, Somers, NY (US); Zeiter Farah, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 465 days.

(21) Appl. No.: 14/242,364

(22) Filed: Apr. 1, 2014

(65) Prior Publication Data
US 2015/0273767 A1    Oct. 1, 2015

(51) Int. Cl.
| B29C 67/00 | (2017.01) |
| G03G 15/22 | (2006.01) |
| B33Y 10/00 | (2015.01) |
| B33Y 30/00 | (2015.01) |
| B33Y 50/02 | (2015.01) |

(52) U.S. Cl.
CPC ...... *B29C 67/0088* (2013.01); *B29C 67/0066* (2013.01); *G03G 15/224* (2013.01); *B33Y 10/00* (2014.12); *B33Y 30/00* (2014.12); *B33Y 50/02* (2014.12)

(58) Field of Classification Search
CPC ............ B29C 67/0051; B29C 67/0066; B29C 67/0085; B29C 67/0088; B33Y 10/00; B33Y 30/00; B33Y 50/02; G03G 15/224
USPC .......................................... 156/367; 425/140
See application file for complete search history.

(56) References Cited

U.S. PATENT DOCUMENTS

| 2,297,691 A | 10/1942 | Carlson |
| 4,988,602 A | 1/1991 | Jongewaard et al. |
| 5,088,047 A | 2/1992 | Bynum |
| 5,099,288 A | 3/1992 | Britto et al. |
| 5,254,421 A | 10/1993 | Coppens et al. |
| 5,354,414 A | 10/1994 | Feygin |
| 5,354,799 A | 10/1994 | Bennett et al. |

(Continued)

FOREIGN PATENT DOCUMENTS

| CN | 101310964 A | 11/2008 |
| EP | 0712051 A2 | 5/1996 |

(Continued)

OTHER PUBLICATIONS

International Search Report and Written Opinion dated Jul. 20, 2015 for corresponding International Application No. PCT/US2015/017988, filed Feb. 27, 2015.

(Continued)

*Primary Examiner* — George Koch
(74) *Attorney, Agent, or Firm* — Peter J. Ims; Westman, Champlin & Koehler, P.A.

(57) ABSTRACT

A method and system for printing a three-dimensional part, which includes rotating a transfer belt with a developed layer, scanning the developed layer on the rotating transfer belt, pressing the developed layer into contact with an intermediate build surface of the three-dimensional part retained on a moveable build platform, scanning the pressed layer on the three-dimensional part, comparing the scanned layers to detect an overlay error, and adjusting a position of the moveable build platform relative to the transfer belt to reduce the overlay error for a subsequent developed layer.

7 Claims, 10 Drawing Sheets

(56) References Cited

U.S. PATENT DOCUMENTS

| | | |
|---|---|---|
| 5,514,232 A | 5/1996 | Burns |
| 5,592,266 A | 1/1997 | Park et al. |
| 5,593,531 A | 1/1997 | Penn |
| 5,594,652 A | 1/1997 | Penn et al. |
| 5,866,058 A | 2/1999 | Batchelder et al. |
| 5,981,616 A | 11/1999 | Yamamura et al. |
| 5,990,268 A | 11/1999 | Dickens, Jr. et al. |
| 6,052,551 A | 4/2000 | De Cock et al. |
| 6,066,285 A | 5/2000 | Kumar |
| 6,169,605 B1 | 1/2001 | Penn et al. |
| 6,206,672 B1 | 3/2001 | Grenda |
| 6,329,115 B1 | 12/2001 | Yamashita |
| 6,376,148 B1 | 4/2002 | Liu et al. |
| 6,492,651 B2 | 12/2002 | Kerekes |
| 6,509,128 B1 | 1/2003 | Everaerts et al. |
| 6,531,086 B1 | 3/2003 | Larsson |
| 6,780,368 B2 | 8/2004 | Liu et al. |
| 6,799,959 B1 | 10/2004 | Tochimoto et al. |
| 6,815,636 B2 | 11/2004 | Chung et al. |
| 6,887,640 B2 | 5/2005 | Zhang et al. |
| 7,011,783 B2 | 3/2006 | Fong |
| 7,077,638 B2 | 7/2006 | Leyden et al. |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Khoshnevis |
| 7,435,763 B2 | 10/2008 | Farr et al. |
| 7,815,826 B2 | 10/2010 | Serdy et al. |
| 7,988,906 B2 | 8/2011 | Monsheimer et al. |
| 8,047,251 B2 | 11/2011 | Khoshnevis |
| 8,119,053 B1 | 2/2012 | Bedal et al. |
| 8,123,999 B2 | 2/2012 | Priedeman, Jr. et al. |
| 8,124,192 B2 | 2/2012 | Paasche et al. |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. |
| 8,246,888 B2 | 8/2012 | Hopkins et al. |
| 8,249,480 B2 | 8/2012 | Aslam et al. |
| 8,459,280 B2 | 6/2013 | Swanson et al. |
| 2002/0093115 A1 | 7/2002 | Jang et al. |
| 2002/0145213 A1 | 10/2002 | Liu et al. |
| 2003/0087176 A1 | 5/2003 | Ezenyilimba et al. |
| 2004/0173946 A1 | 9/2004 | Pfeifer et al. |
| 2004/0232583 A1 | 11/2004 | Monsheimer et al. |
| 2005/0207801 A1 | 9/2005 | Kunii et al. |
| 2005/0218549 A1 | 10/2005 | Farr et al. |
| 2008/0032083 A1 | 2/2008 | Serdy et al. |
| 2008/0169585 A1 | 7/2008 | Zinniel |
| 2008/0169589 A1 | 7/2008 | Sperry et al. |
| 2008/0171284 A1 | 7/2008 | Hull et al. |
| 2008/0226346 A1 | 9/2008 | Hull et al. |
| 2009/0236775 A1 | 9/2009 | Monsheimer et al. |
| 2011/0117485 A1 | 5/2011 | Hermann et al. |
| 2011/0186081 A1 | 8/2011 | Dunn et al. |
| 2011/0190446 A1 | 8/2011 | Matsui et al. |
| 2012/0041132 A1 | 2/2012 | Monsheimer et al. |
| 2012/0139167 A1 | 6/2012 | Fruth et al. |
| 2012/0154773 A1* | 6/2012 | Beyer .................. G03F 1/72 355/52 |
| 2012/0201960 A1 | 8/2012 | Hartmann et al. |
| 2012/0202012 A1 | 8/2012 | Grebe et al. |
| 2012/0237870 A1 | 9/2012 | Watanabe et al. |
| 2012/0263488 A1 | 10/2012 | Aslam et al. |
| 2012/0274002 A1 | 11/2012 | Uchida |
| 2013/0075033 A1* | 3/2013 | Chillscyzn ......... B29C 67/0074 156/277 |
| 2013/0077996 A1 | 3/2013 | Hanson et al. |
| 2013/0077997 A1 | 3/2013 | Hanson et al. |
| 2013/0171434 A1 | 7/2013 | Hirth et al. |
| 2013/0186549 A1 | 7/2013 | Comb et al. |
| 2013/0186558 A1 | 7/2013 | Comb et al. |
| 2014/0004462 A1 | 1/2014 | Zaretsky |
| 2014/0167326 A1 | 6/2014 | Jones et al. |

FOREIGN PATENT DOCUMENTS

| | | |
|---|---|---|
| GB | 2446386 A | 8/2008 |
| JP | 5165350 A | 7/1993 |
| JP | 8281808 A | 10/1996 |
| JP | 2001075376 A | 3/2001 |
| JP | 2002347129 A | 12/2002 |
| JP | 2003053849 A | 2/2003 |
| JP | 2003071940 A | 3/2003 |
| JP | 2005062860 A | 3/2005 |
| JP | 2006182813 A | 7/2006 |
| WO | 9851464 A1 | 11/1998 |
| WO | 2007114895 A2 | 10/2007 |
| WO | 2011065920 A1 | 6/2011 |
| WO | 2012034666 A1 | 3/2012 |

OTHER PUBLICATIONS

"Xerography", Aug. 27, 2010, pp. 1-4, http:/en.wikipedia.org/wiki/Xerography.

Jones, Jason, "Selective Laser Printing", Published Prior to Jan. 14, 2013, 1 page.

* cited by examiner

ELECTROPHOTOGRAPHY-BASED ADDITIVE MANUFACTURING WITH OVERLAY CONTROL

BACKGROUND

The present disclosure relates to additive manufacturing systems and processes for printing three-dimensional (3D) parts and support structures. In particular, the present disclosure relates to additive manufacturing systems and processes for building 3D parts and support structures using an imaging process, such as electrophotography.

Additive manufacturing systems (e.g., 3D printers) are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to an additive manufacturing system for printing a 3D part. The additive manufacturing system includes one or more electrophotography engines configured to develop layers of the 3D part, a rotatable transfer belt configured to receive the developed layers from the one or more electrophotography engines, a build platform, and one or more gantry mechanisms configured to move the build platform. The system also includes a pressing element configured to engage with the rotatable transfer belt to press the developed layers into contact with intermediate build surfaces of the 3D part on the build platform in a layer-by-layer manner, and one or more imaging sensors configured to scan the developed layers on the rotatable transfer belt and on the 3D part, and to transmit data relating to the scans. The system further includes a controller assembly configured to receive the transmitted data from the one or more imaging sensors, to detect overlay errors from the scans, and to adjust the one or more gantry mechanisms to reduce the overlay errors.

Another aspect of the present disclosure is directed to a method for printing a 3D part with an additive manufacturing system. The method includes producing a developed layer of a part material with an electrophotography engine of the additive manufacturing system, transferring the developed layer from the electrophotography engine to a transfer belt of the additive manufacturing system, and rotating the transfer belt with the developed layer. The method also includes scanning the developed layer on the rotating transfer belt, pressing the developed layer into contact with an intermediate build surface of the 3D part retained on a moveable build platform, and scanning the pressed layer on the 3D part. The method further includes comparing the scanned layers to detect an overlay error, and adjusting a position of the moveable build platform relative to the transfer belt to reduce the overlay error for a subsequent developed layer.

Another aspect of the present disclosure is directed to a method for reducing an overlay error in an additive manufacturing system. The method includes rotating a transfer belt of the additive manufacturing system having a developed layer, scanning the developed layer on the rotating transfer belt, and pressing the developed layer into contact with an intermediate build surface of a 3D part retained on a build platform of the additive manufacturing system. The method also includes moving the build platform with the pressed layer in a process direction, scanning the pressed layer on the 3D part, comparing the scanned layers to detect the overlay error, and adjusting a position of the build platform in a direction that is perpendicular to the process direction, based on the detected overlay error.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis.

However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
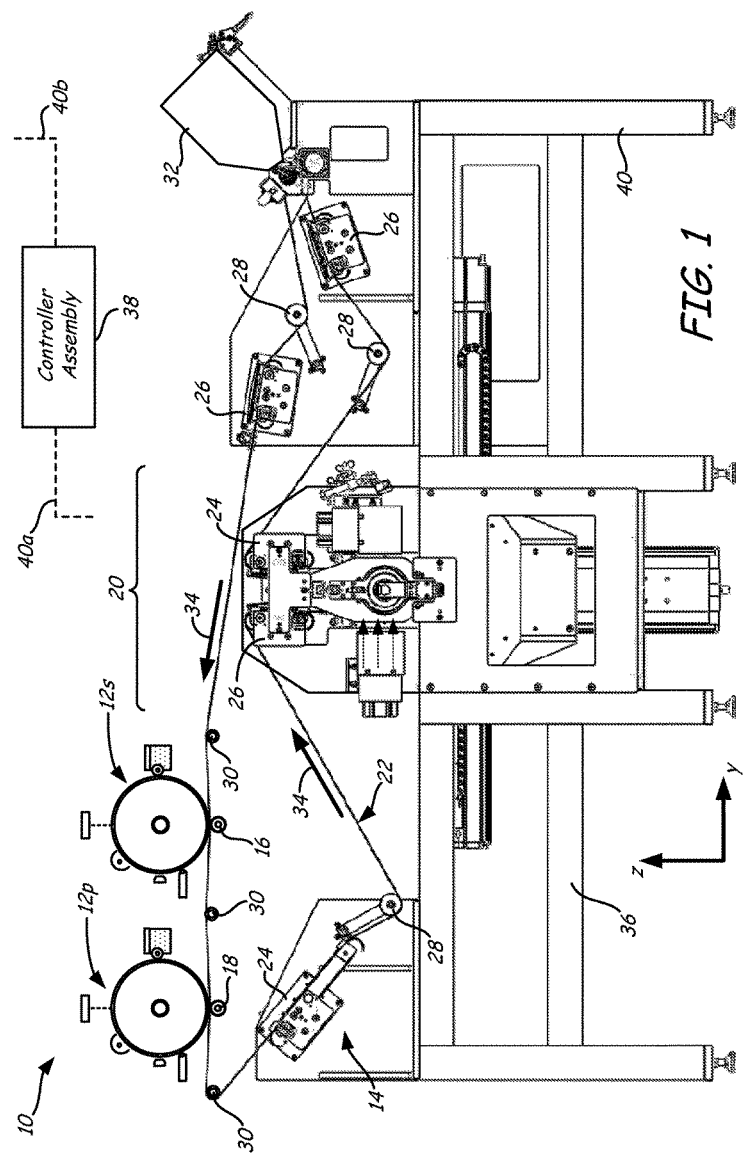
FIG. 1 is a front view of an example electrophotography-based additive manufacturing system for printing 3D parts and support structures with the use of the overlay control of the present disclosure.

The present disclosure is directed to an electrophotography-based additive manufacturing system and process for controlling the x-y accuracies of printed layers of part and support materials. During an electrophotography printing operation, one or more electrophotography (EP) engines may develop or otherwise image each layer of the part and support materials using an electrophotographic process. The developed layers are then transferred with a transfer medium (e.g., transfer belt or drum) to a layer transfusion assembly where they are transfused (e.g., using heat and/or pressure) to print one or more 3D parts and support structures in a layer-by-layer manner.

Printing accuracies between successive layers can be difficult to control due to the high resolutions and fast printing speeds that are achievable with electrophotography-based additive manufacturing. This difficulty can result in x-y alignment errors between the successive layers, which are primarily caused by two contributors. The first contributor involves "x-y registration errors", which are alignment errors between the successive developed layers when transferring from the EP engines to the transfer medium (e.g., transfer belt or drum). The second contributor involves "x-y overlay errors", which are alignment errors between the successive developed layers at the layer transfusion assembly, where the developed layers are transfused to the 3D part and support structure.

These alignment errors can prevent the part and support materials from being printed at precisely the correct locations in the x-y build plane, which can reduce printing accuracies, particularly for fine-feature details. Additionally, it may be true that in some situations, these alignment errors can form overhanging ridges, which can grow along the z-axis to impair part accuracies and even impact the system performance if left uncorrected.

One solution to consider to reduce x-y alignment errors is to slow down the printing speed, thereby allowing the system to operate with greater process tolerances. However, one of the major advantages of electrophotography is the potential for fast printing speeds. As such, in order to correct these x-y alignment errors without sacrificing printing speeds, the system discussed herein incorporates multiple sensors at the layer transfusion assembly to scan the layers prior to and after the transfusion step.

Because the x-y registration errors at the EP engines are upstream from the layer transfusion assembly, scanning the layers only at the EP engines will not help against downstream x-y overlay errors that occur at the layer transfusion assembly. However, the x-y overlay errors are impacted by the x-y registration errors, as well as alignment errors occurring at the layer transfusion assembly. As such, scanning the layers prior to and after the transfusion step may be used to reduce or eliminate x-y alignment errors caused by both the x-y registration errors (at the EP engines) and the x-y overlay errors (at the layer transfusion assembly).

A controller assembly of the system may then compare these scans and compensate for detected x-y alignment errors. In some embodiments, the compensation may be performed by updating calibration parameters of the system. Alternatively, and more preferably, the controller assembly compensates for the detected x-y alignment errors through the use of a feedback control. With the feedback control, the controller assembly can adjust the x-y positioning of a platen stage relative to the transfer belt or drum. This can directly compensate for x-y overlay errors, as well as any upstream x-y registration errors occurring at the EP engines.

FIGS. 1-4 illustrate system 10, which is an example electrophotography-based additive manufacturing system for printing 3D parts from a part material, and associated support structures from a support material, and is designed to reduce or eliminate x-y alignment errors. As shown in FIG. 1, system 10 includes a pair of EP engines 12$p$ and 12$s$, belt transfer assembly 14, biasing mechanisms 16 and 18, and layer transfusion assembly 20. Examples of suitable components and functional operations for system 10 include those disclosed in Hanson et al., U.S. Publication Nos.

2013/0077996 and 2013/0077997, and in Comb et al., U.S. Publication Nos. 2013/0186549 and 2013/0186558.

EP engines 12p and 12s are imaging engines for respectively imaging or otherwise developing layers of the part and support materials from associated digital bitslices. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

The components of system 10 may be retained by one or more frame structures, such as frame 36. Additionally, the components of system 10 are preferably retained within an enclosable housing (not shown) that prevents ambient light from being transmitted to the components of system 10 during operation.

System 10 also includes controller assembly 38, which is one or more computer-based systems configured to operate the components of system 10. Controller assembly 38 may communicate over communication line 40a with the various components of system 10, such as EP engines 12p and 12s, belt transfer assembly 14, biasing mechanisms 16 and 18, layer transfusion assembly 20, and various sensors, calibration devices, display devices, and/or user input devices.

Additionally, controller assembly 38 may also communicate over communication line 40b with external devices, such as other computers and servers over a network connection (e.g., a local area network (LAN) connection). While communication lines 40a and 40b are each illustrated as a single signal line, they may each include one or more electrical, optical, and/or wireless signal lines.

Preferably, the one or more computer-based systems of controller assembly 38 are internal to system 10, allowing a user to operate system 10 over a network communication line 40b, such as from an external computer in the same manner as a two-dimensional printer. Alternatively, controller assembly 38 may also include one or more external computer-based systems (e.g., desktop, laptop, server-based, cloud-based, tablet, mobile media device, and the like) that may communicate with the internal computer-based system(s) of controller assembly 38, as well as communicating over a network via communication line 40b. In this alternative embodiment, the processing functions of controller assembly 38 discussed below may be divided between the internal and external computer-based systems. In yet another alternative embodiment, the one or more computer-based systems of controller assembly 38 may all be located external to system 10 (e.g., one or more external computers), and may communicate with system 10 over communication line 40a.

Figure 2:
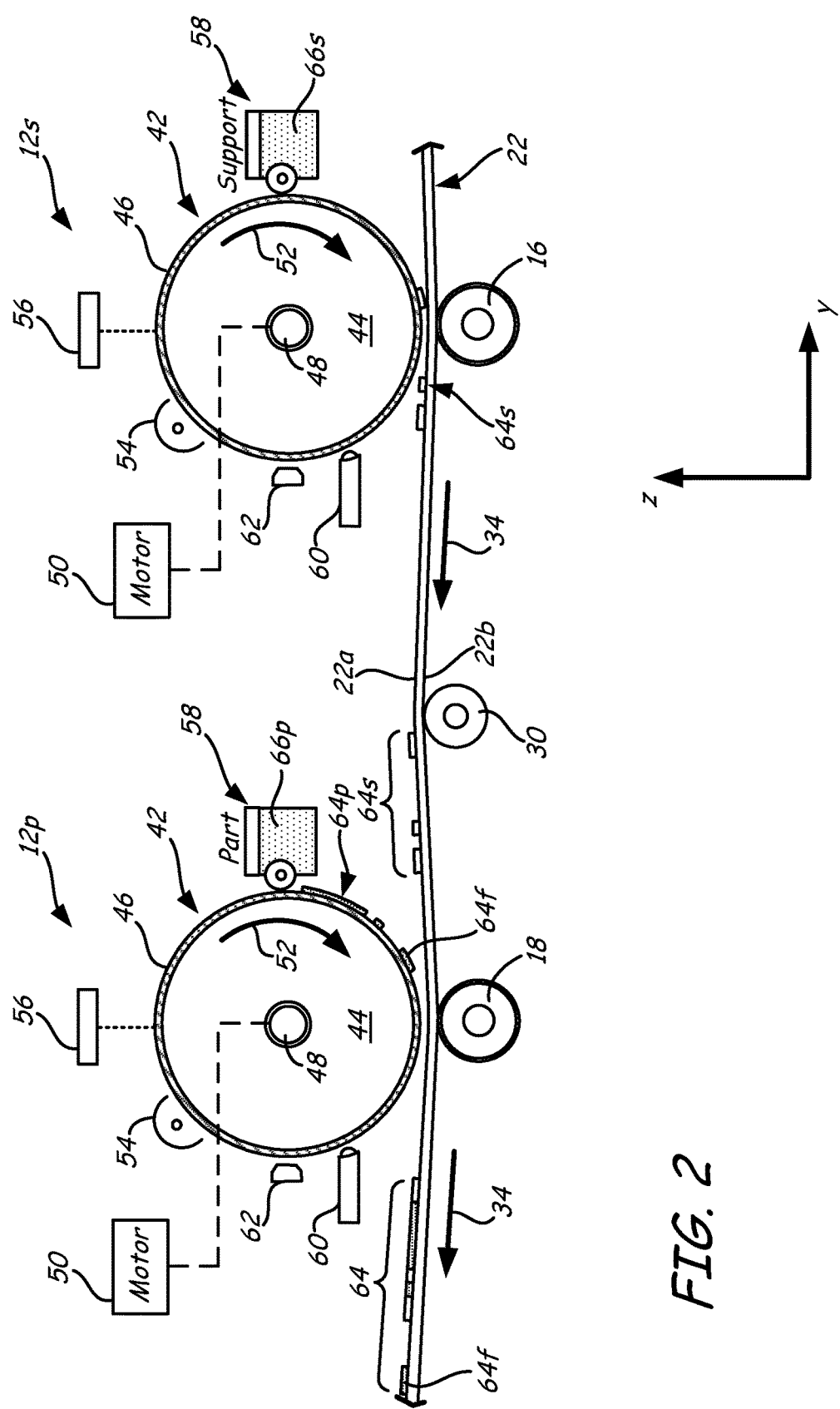
FIG. 2 is a schematic front view of a pair of electrophotography engines of the system for developing layers of the part and support materials.

FIG. 2 illustrates EP engines 12p and 12s, where EP engine 12s (i.e., the upstream EP engine relative to the rotational direction of belt 22) develops layers of the support material, and EP engine 12p (i.e., the downstream EP engine relative to the rotational direction of belt 22) develops layers of the part material. In alternative embodiments, the arrangement of EP engines 12p and 12s may be reversed such that EP engine 12p is upstream from EP engine 12s relative to the rotational direction of belt 22. In further alternative embodiments, system 10 may include three or more EP engines for printing layers of additional materials (e.g., materials of different colors, opacities, and/or functional characteristics).

In the shown embodiment, EP engines 12p and 12s may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of the 3D part or support structure (or negative images), and to attract charged particles of the part or support material of the present disclosure to the charged or discharged image areas based on the Q/M ratios of the materials, thereby creating the layers of the 3D part or support structure (and preferably a fiducial structure, as discussed below).

As further shown, EP engines 12p and 12s also includes charge inducer 54, imager 56, development station 58, cleaning station 60, and discharge device 62, each of which may be in signal communication with controller assembly 38 over communication line 40a. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12s is used to form layers 64s of the support material (referred to as support material 66s), where a supply of support material 66s may be retained by development station 58 (of EP engine 12s) along with carrier particles. Similarly, the image-forming assembly for surface 46 of EP engine 12p is used to form layers 64p of the part material (referred to as part material 66p), where a supply of part material 66p may be retained by development station 58 (of EP engine 12p) along with carrier particles.

As further shown in FIG. 2, each layer 64p may include a fiducial segment 64f of the part material 66p. As discussed below, fiducial segment 64f preferably has known dimensions and a preset location that is offset and separate from the remaining portions of layers 64p and 64s. As such, fiducial segment 64f may function as a convenient test sample for scanning at layer transfusion assembly 20. In some alternative embodiments, support layer 64s may also include a fiducial segment of the support material 66s, where the support material fiducial portion may be formed in combination with, or as an alternative to fiducial segment 64f.

Controller assembly 38 may generate fiducial segments 64f by modifying the bitslices used to generate layer 64p. For example, controller assembly 38 may add bitslice pixels for fiducial segments 64f at coordinate locations that are outside the bounding boxes of layer 64p, but still within the usable build volume of system 10. This allows each fiducial segment 64f to be offset and separate from the remaining portion of layer 64p and from layer 64s. In the shown example, fiducial segment 64f is developed at the leading end of layer 64p.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 corresponds to the associated bitslices received from controller assembly 38 over communication line 40a, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66p or support material 66s, preferably in powder form, along with carrier particles. Development stations 58 may function in a similar manner to single or dual component development systems and toner cartridges used in 2D electrophotography systems. For example, each development station 58 may include an enclosure for retaining the part material 66p or support material 66s and carrier particles. When agitated, the carrier particles generate triboelectric charges to attract the powders of the part material 66p or support material 66s, which charges the attracted powders to a desired sign and magnitude based on their Q/M ratios.

Each development station 58 may also include one or more devices for transferring the charged part material 66p or support material 66s to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66p or support material 66s is attracted to the appropriately charged regions of the latent image on surface 46, utilizing either charged area development or discharged area development (depending on the electrophotography mode being utilized).

This creates successive layers 64p or 64s as photoconductor drum 12 continues to rotate in the direction of arrow 52, where the successive layers 64p or 64s correspond to the successive bitslices of the digital model of the 3D part or support structure. After being developed, the successive layers 64p or 64s are then rotated with surface 46 in the direction of arrow 52 to a transfer region in which layers 64p or 64s are successively transferred from photoconductor drum 42 to belt 22. While illustrated as a direct engagement between photoconductor drum 42 and belt 22, in some preferred embodiments, EP engines 12p and 12s may also include intermediary transfer drums and/or belts, as discussed further below in FIG. 3.

After a given layer 64p or 64s is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64p or 64s passes cleaning station 60. Cleaning station 60 is a station configured to remove any residual, non-transferred portions of part or support material 66p or 66s. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64p and 64s from photoconductor drum 42 (or an intermediary transfer drum or belt) to layer transfusion assembly 20. Examples of suitable transfer belts for belt 22 include those disclosed in Comb et al., U.S. Publication Nos. 2013/0186549 and 2013/0186558. Belt 22 includes front surface 22a and rear surface 22b, where front surface 22a faces surfaces 46 of photoconductor drums 42 and rear surface 22b is in contact with biasing mechanisms 16 and 18.

Biasing mechanisms 16 and 18 are configured to induce electrical potentials through belt 22 to electrostatically attract layers 64p and 64s from EP engines 12p and 12s to belt 22. Because layers 64p and 64s are each only a single layer increment in thickness at this point in the process, electrostatic attraction is suitable for transferring layers 64p and 64s from EP engines 12p and 12s to belt 22.

Controller assembly 38 preferably rotates photoconductor drums 42 of EP engines 12p and 12s at the same rotational rates that are synchronized with the line speed of belt 22 and/or with any intermediary transfer drums or belts. This allows system 10 to develop and transfer layers 64p and 66s in coordination with each other from separate developer images. In particular, as shown, each part layer 64p is preferably transferred to belt 22 with proper registration with each support layer 64s to preferably produce a combined or composite part and support material layer 64, which includes the fiducial segment 64f.

This allows layers 64p and 64s to be transfused together, typically requiring the part and support materials to have thermal properties and melt rheologies that are similar or substantially the same. As can be appreciated, some layers transferred to layer transfusion assembly 20 may only include support material 66s or may only include part material 66p, depending on the particular bitslices that are transmitted to each of EP engines 12p and 12s.

In an alternative embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part and support structure.

Figure 3:
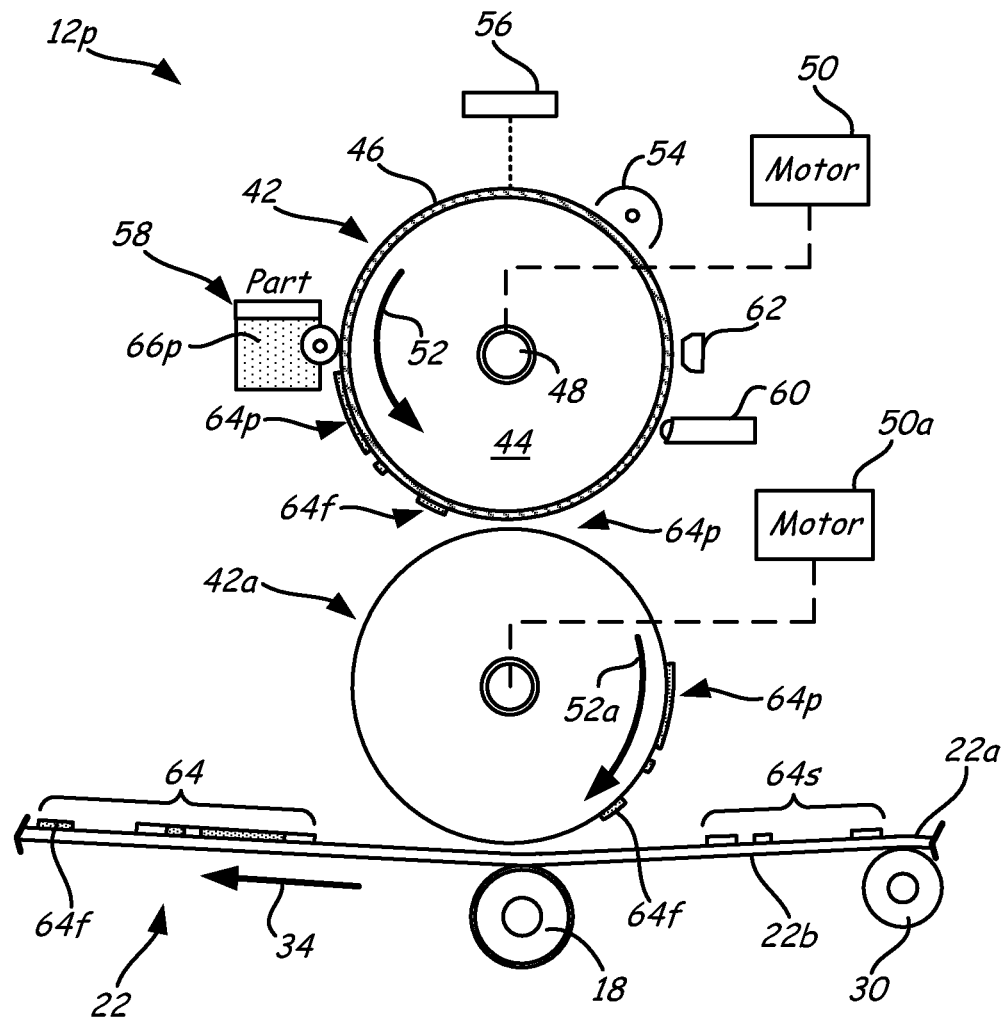
FIG. 3 is a schematic front view of an alternative electrophotography engine, which includes an intermediary drum or belt.

In some embodiments, one or both of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a. Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired.

As briefly mentioned above, one of the primary contributors to x-y alignment error involves x-y registration errors between the successive developed layers 64 when transferred from the EP engines 12p and 12s to belt 22. As also mentioned above, controller assembly 38 preferably rotates photoconductor drums 42 of EP engines 12p and 12s at the same rotational rates that are synchronized with the line speed of belt 22 and/or with any intermediary transfer drums or belts. This preferably spaces each successive developed layer 64 apart by a known spacing distance that corresponds to the x-y overlay alignment at layer transfusion assembly 20.

However, if these spacing distances between the successive developed layers 64 fluctuate or drift over time, such as due to thermal expansion or stretching of belt 22, or velocity variations of the belt motion, the developed layers 64 may begin to exhibit x-y registration errors. These x-y registration errors will then carry over to the transfusion step at layer transfusion assembly 20 and impact the transfusion overlays. As discussed below, to compensate for these alignment errors, layer transfusion assembly 20 includes one or more imaging sensors to scan the layers prior to and after the transfusion steps. This allows controller assembly 38 to compensate for the x-y registration errors occurring at the engagements between EP engines 12p and 12s and belt 22, as well as any additional x-y overlay errors that occur at layer transfusion assembly 20.

Figure 4:
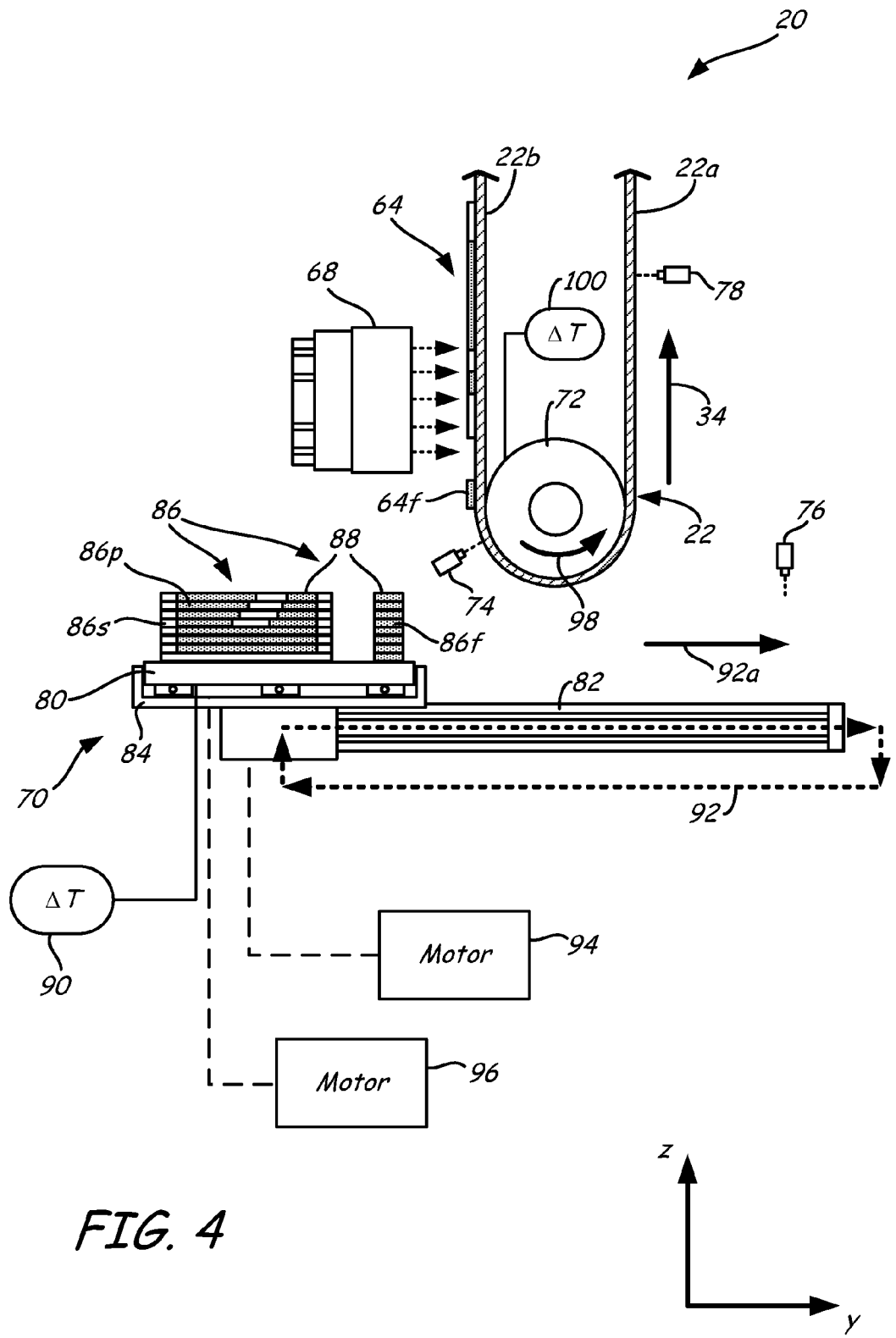
FIG. 4 is a schematic front view of a layer transfusion assembly of the system for performing layer transfusion steps with the developed layers, and for measuring scanning the layers with one or more imaging sensors.

FIG. 4 illustrates an example embodiment for layer transfusion assembly 20. As shown, layer transfusion assembly 20 is an example printing assembly that includes heater 68, platen assembly 70, and nip roller 72. Additionally, layer transfusion assembly 20 also includes one or more of imaging sensors 74, 76, and 78 located at different points along the process paths of belt 22 and layers 64. In alternative embodiments, layer transfusion assembly 20 may also optionally include one or more post-fuse heaters and air jets (or other cooling units), and/or other arrangements (e.g., press plates, multiple rollers, etc. . . . ) as described in Comb et al., U.S. Publication Nos. 2013/0186549 and 2013/0186558.

Heater 68 is one or more heating devices (e.g., an infrared heater and/or a heated air jet) configured to heat layers 64 to a desired elevated temperature prior to reaching nip roller 72. Each layer 64 desirably passes by (or through) heater 68 for a sufficient residence time to heat the layer 64 to the desired elevated temperature. In some embodiments, heater 68 may be a pre-sintering heater, such as disclosed in Comb et al., U.S. patent application Ser. No. 14/218,102.

Platen assembly 70 is a platform and gantry assembly of system 10, which includes build platform 80, y-stage gantry 82, and x-stage gantry 84. Build platform 80 is a platform or platen of system 10 that is configured to receive the heated layers 64 (or separate layers 64p and 64s) for printing a 3D part, support structure, and fiducial structure, referred to as 3D part 86p, support structure 86s, and fiducial structure 86f, in a layer-by-layer manner. For ease of discussion, 3D part 86p, support structure 86s, and fiducial structure 86f are herein referred to collectively as printed part 86, which has an intermediate build surface 88 on which a subsequent layer 64 can be applied onto.

Fiducial structure 86f is formed from the successive fiducial segments 64f. Because fiducial segments 64f are offset and separate from the remaining portions of layers 64p and from layers 64s, fiducial structure 64f is also offset and separate from 3D part 86p and support structure 86s, as shown. This allows imaging sensors 74, 76, and 78 to effectively scan the dimensions of fiducial segments 64f and fiducial structure 86f. Accordingly, controller assembly 38 may utilize the scans of fiducial segments 64f and fiducial structure 86f for detecting x-y overlay errors, as opposed to the more complicated bitslice geometries of 3D part 86p and support structure 86s.

However, in alternative embodiments, controller assembly 38 may utilize the scans of 3D part 86p and/or support structure 86s for detecting x-y overlay errors, if desired. As such, scanning a 3D part (e.g., with imaging scanners 74 and 76) may refer to the scanning of the intended 3D part (e.g., 3D part 86p), the support structure (e.g., support structure 86s), and/or a fiducial structure (e.g., fiducial structure 86f).

In some embodiments, build platform 80 may include removable film substrates (not shown) for receiving the printed layers 64, where the removable film substrates may be restrained against build platform 80 using any suitable technique (e.g., vacuum drawing, removable adhesive, mechanical fastener, magnetic attraction, and the like). In the shown embodiment, build platform 80 is heatable with heating element 90 (e.g., an electric heater), which is configured to heat and maintain build platform 80 at a desired elevated temperature.

Build platform 80 is supported by x-stage gantry 84, which itself is supported by y-stage gantry 82. Y-stage gantry 82 is a first gantry mechanism configured to move build platform 80 and x-stage gantry 84 along the z-axis and the y-axis, preferably to produce a reciprocating rectangular pattern (illustrated by broken lines 92), where the primary motion is back-and-forth along the y-axis.

While the reciprocating rectangular pattern is described as a rectangular pattern with sharp axial corners (defined by arrows 92), y-stage gantry 82 may move build platform 80 in a reciprocating rectangular pattern having rounded or oval-defining corners, so long as build platform 80 moves along the y-axis process direction (illustrated by arrow 92a) during the pressing steps at nip roller 72. Y-stage gantry 82 may be operated by motor 94 based on commands from controller assembly 38, where motor 94 may be an electrical motor, a hydraulic system, a pneumatic system, or the like.

X-stage gantry 84 is a second gantry mechanism configured to move build platform 80 along the x-axis relative to y-stage gantry 82, thereby moving build platform 80 and printed part 86 in perpendicular or lateral directions relative to the y-axis process direction of arrow 92a. As discussed below, x-stage gantry 84 allows controller assembly 38 to shift the location of build surface 88 along the lateral x-axis to compensate for detected overlay errors along the lateral x-axis. X-stage gantry 84 may be operated by motor 96 based on commands from controller assembly 38, where motor 96 may also be an electrical motor, a hydraulic system, a pneumatic system, or the like.

Nip roller 72 is an example heatable element or heatable layer transfusion element, which is configured to rotate around a fixed axis with the movement of belt 22. In particular, nip roller 72 may roll against rear surface 22b in the direction of arrow 98 while belt 22 rotates in the direction of arrow 34. In the shown embodiment, nip roller 72 is heatable with heating element 100 (e.g., an electric heater). Heating element 104 is configured to heat and maintain nip roller 72 at a desired elevated temperature.

The desired elevated temperatures mentioned above may be independently selected and preset temperatures for transfusing the layers 64p and the support layers 64s together to the build surface 88 of printed part 86 as combined or composite layers 64. Examples of suitable desired elevated temperatures for each step in layer transfusion assembly 20 include those discussed in Comb et al., U.S. Publication Nos. 2013/0186549 and 2013/0186558; and in Comb et al., U.S. patent application Ser. No. 14/218,102.

During a printing operation, belt 22 carries a layer 64 past heater 68, which may heat the layer 64 and the associated region of belt 22 to the desired elevated temperature. The continued rotation of belt 22 around nip roller 72 allows imaging sensor 74 to scan the heated layer 64 prior to the pressing step, as explained below. In particular, imaging sensor 74 preferably scans the heated layer 64 at a location that is as close to the nip as possible, such as at an engagement location of belt 22 and nip roller 72, as shown. The continued rotation of belt 22 and the movement of build platform 80 then align the heated layer 64 with the build surface 88 of printed part 86.

Y-stage gantry 82 may move build platform 80 along the y-axis process direction of arrow 92a, preferably at a rate that is synchronized with the rotational rate of belt 22 in the direction of arrow 34 (i.e., the same directions and speed). This causes rear surface 22b of belt 22 to rotate around nip roller 72 to nip belt 22 and the heated layer 64 against the build surface 88 of printed part 86. This presses the heated layer 64 between the build surface 88 at the location of nip roller 72 to at least partially transfuses heated layer 64 to the build surface 88.

As the transfused layer 64 passes the nip of nip roller 72, belt 22 wraps around nip roller 72 to separate and disengage from build platform 80 and 3D part 86. This assists in releasing the transfused layer 64 from belt 22, allowing the transfused layer 64 to remain adhered to 3D part 86. After release, y-stage gantry 82 continues to move build platform 80 along the y-axis process direction of arrow 92a. This allows imaging sensor 76 to scan the transfused layer 64 after to the pressing step, as also explained below.

Additionally, imaging sensor 78 may scan front surface 22a of belt 22 to identify any residual amounts of the part or support materials that remained adhered to belt 22. This can indicate overhanging ridges of the transfused layer 64 that were not able to adhere to any underlying build surface 88 due to misalignments.

As mentioned above, in some embodiments, layer transfusion assembly 20 may also optionally include one or more post-fuse heaters and air jets (or other cooling units), and/or other arrangements (e.g., press plates, multiple rollers, etc. . . . ) as described in Comb et al., U.S. Publication Nos. 2013/0186549 and 2013/0186558. In these embodiments, imaging sensor 76 may be located at any suitable location relative to the post-fuse heaters and air jets or other cooling units.

Y-stage gantry 82 may then actuate build platform 80 and z-stage gantry 84 downward, and move them back along the y-axis to a starting position along the y-axis, following the reciprocating rectangular pattern of arrows 96. Build platform 80 desirably reaches the starting position for proper overlay alignment with the next layer 64. In some embodiments, gantry 84 may also actuate build platform 80 and z-stage gantry 84 upward for alignment with the next layer 64. The same process may then be repeated for each remaining layer 64.

Collectively, imaging sensors 74, 76, and 78 preferably include one or more line scan cameras oriented along the lateral x-axis for scanning the layers 64 or belt 22. For instance, in some embodiments, imaging sensors 74, 76, and 78 may each include a separate and independent line scan camera that communicates with controller assembly 38 over communication line 40a. This arrangement allows controller assembly 38 to receive scanned image data from each of imaging sensors 74, 76, and 78 over communication line 40a independently of each other.

Alternatively, one or more of imaging sensors 74, 76, and 78 may incorporate optical lenses that route received light from the scanned layers 64 to a shared line scan camera. For example, imaging sensors 74 and 76 may each include separate optical lenses for routing received light to a shared line scan camera. In this case, the received light images from imaging sensor 74 may be focused onto a first sensor portion of the shared line scan camera, and the received light images from imaging sensor 76 may be focused onto a second sensor portion of the shared line scan camera. The combined image data may then be transmitted to controller assembly 38 over communication line 40a, where controller assembly 38 may then computationally distinguish the two receive images.

Figure 5:
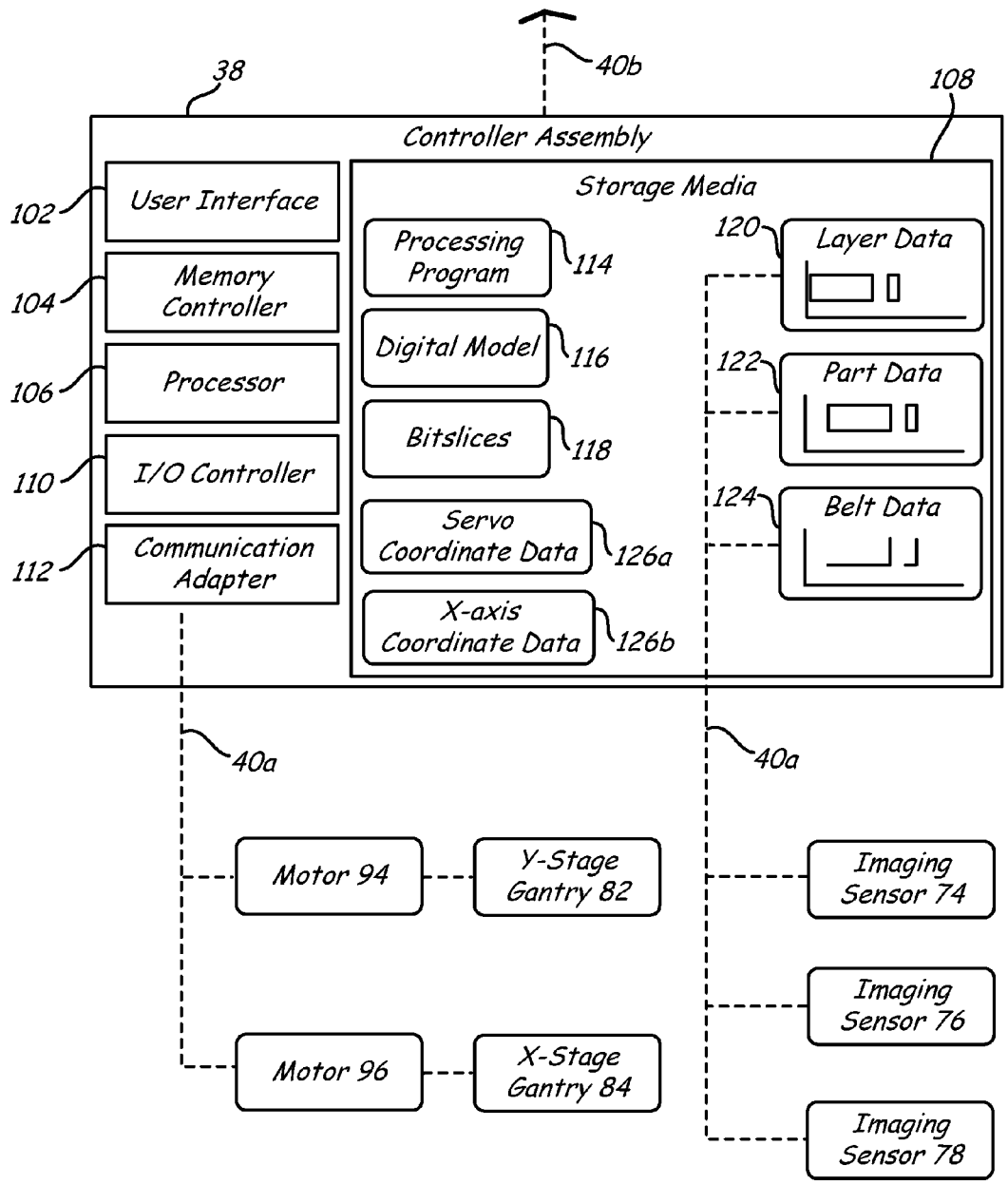
FIG. 5 is a schematic illustration of a controller assembly of the system.

As shown in FIG. 5, controller assembly 38 may include any suitable computer-based hardware, such as user interface 102, memory controller 104, processor 106, storage media 108, input/output (I/O) controller 110, and communication adapter 112. Controller assembly 38 may also include a variety of additional components that are contained in conventional computers, servers, media devices, and/or printer controllers.

User interface 102 is a user-operated interface (e.g., keyboards, touch pads, touch-screen displays, display monitors, and other eye, voice, movement, or hand-operated controls) configured to operate controller assembly 38. Memory controller 104 is a circuit assembly that interfaces the components of controller assembly 38 with one or more volatile random access memory (RAM) modules of storage media 108. Processor 106 is one or more computer-processing units configured to operate controller assembly 38, optionally with memory controller 104. For instance, processor 106 may include one or more microprocessor-based engine control systems and/or digitally-controlled raster imaging processor systems.

Storage media 108 is one or more internal and/or external data storage devices or computer storage media for controller assembly 38, such as volatile RAM modules, read-only memory modules, optical media, magnetic media (e.g., hard disc drives), solid-state media (e.g., FLASH memory and solid-state drives), analog media, and the like. Storage media 108 may retain an executable copy of processing program 114, one or more digital models 116 to be printed with system 10, and generated bitslices 118, each which may be utilized as disclosed in Comb et al., U.S. patent application Ser. No. 14/218,084.

I/O controller 110 is a circuit assembly that interfaces memory controller 104, processor 106, and storage media 108 with various input and output components of controller assembly 38, including communication adapter 112. Communication adapter 112 is one or more wired or wireless transmitter/receiver adapters configured to communicate over communication lines 40a and 40b.

Controller assembly 38 may receive the image data from imaging sensors 74, 76, and 78 and respectively store the received image data as layer data 120 (from imaging sensor 74), part data 122 (from imaging sensor 76), and belt data 124 (from imaging sensor 78). Additionally, storage media 108 may also retain servo coordinate data 126*a*, which maps the servo speed and timing of y-stage gantry 82 with the rotational speed and timing of belt 22. Controller assembly 38 may obtain the rotational speed and timing of belt 22 from a belt encoder (not shown) of belt 22. Furthermore, storage media 108 may also retain x-axis coordinate data 126*b*, which is a coordinate map for positioning build platform 80 along the lateral x-axis with x-stage gantry 84.

As explained below, controller assembly 38 may compare layer data 120 to part data 122 and/or belt data 124 to detect x-y overlay errors at layer transfusion assembly 20. As mentioned above, the x-y overlay errors can be impacted by the x-y registration errors at EP engines 12*p* and 12*s*, as well as alignment errors occurring at layer transfusion assembly 20. For instance, belt 22 may thermally expand or stretch while heating up, which can cause the rotational timing of belt 22 to drift over time relative to the information in servo coordinate data 126*a*. This can accordingly cause successive pressed layers 64 to drift in one or more directions in the x-y build plane, which can result in overhanging ridges. If left uncorrected, these overhanging ridges can grow along the z-axis and potentially impact the system performance.

Figure 6A:
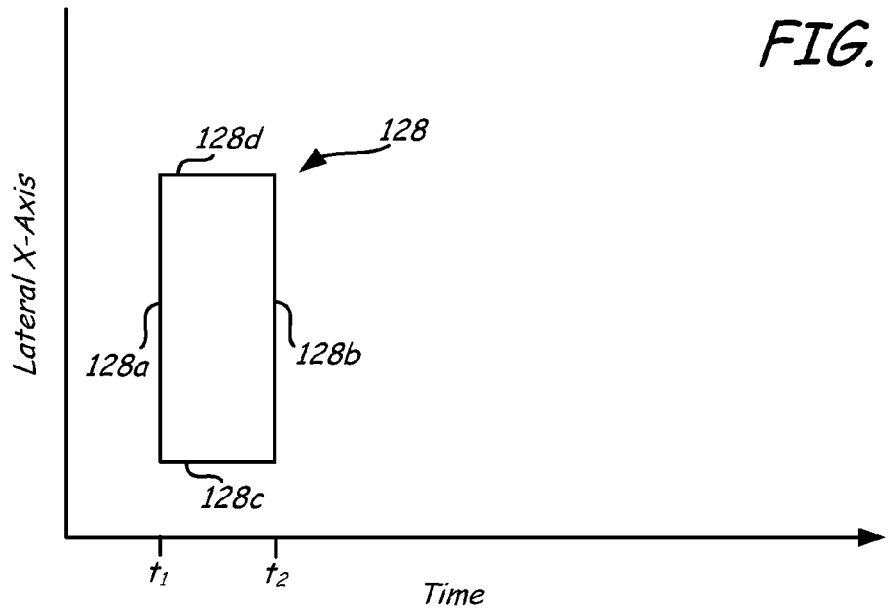
FIGS. 6A and 6B are graphical plots of scanned images, illustrating a first embodied technique for comparing the scans to detect x-y overlay errors.
Figure 6B:
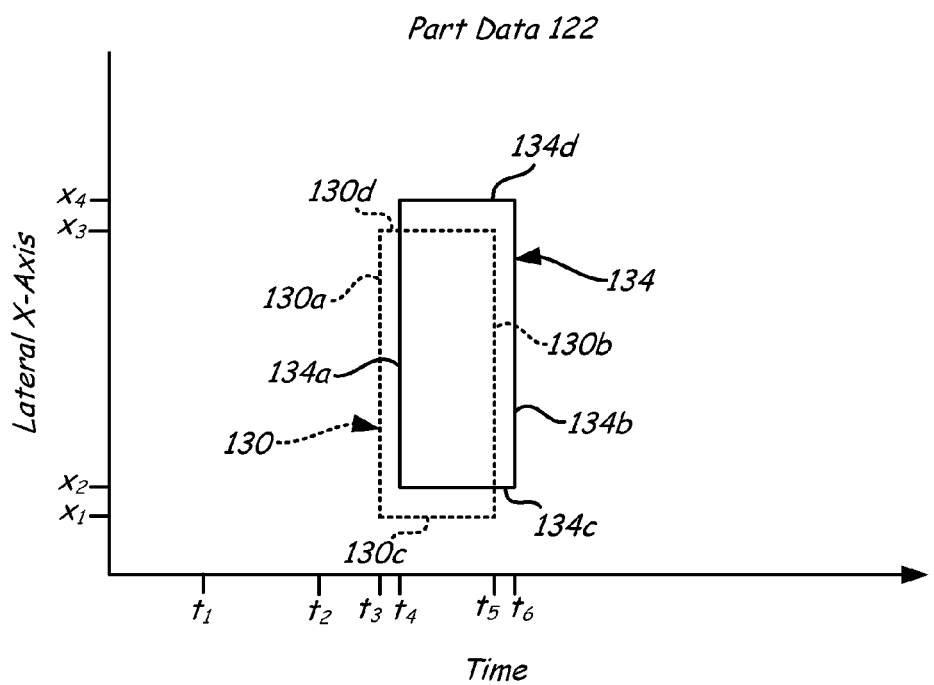

FIGS. 6A and 6B illustrate an example comparison of layer data 120 and part data 122 that controller assembly 38 may perform to detect any x-y overlay errors. It is understood that the plots in FIGS. 6A and 6B are merely illustrative, and controller assembly 38 can perform the comparison on a computational basis.

As shown, the scanned images for layer data 120 and part data 122 may each be plotted on a time-based axis. Because belt 22 and build platform 80 preferably move at synchronized rates, the time axes of the shown plots correspond to the movement speeds and directions of belt 22 (in the direction of arrow 34) and build platform 80 (in the direction of arrow 92*a*).

The following discussion focuses on the scanned images for fiducial segment 64*f* and fiducial structure 86*f*, where the corresponding images for layers 64*p* and 64*s*, 3D part 86*p*, and support structure 86*s* are omitted for ease of discussion. However, controller assembly 38 may alternatively use the scanned images of layers 64*p* and 64*s*, 3D part 86*p*, and support structure 86*s* in the same manner to detect x-y overlay errors, if desired.

As shown in FIG. 6A, layer data 120 includes image 128, which corresponds to a scan of a fiducial segment 64*f* for one of the developed layers 64 on belt 22. This scan is taken by imaging sensor 74 prior to the transfusion step as belt 22 rotates past imaging sensor 74. Image 128 includes leading edge 128*a* of fiducial segment 64*f*, which shows up at time $t_1$, and trailing edge 128*b* of fiducial segment 64*f*, which shows up at time $t_2$. The difference between times $t_1$ and $t_2$ depends on the rotational speed of belt 22 and the dimensions of fiducial segment 64*f*. Additionally, image 128 also shows the lateral edges 128*c* and 128*d* along the lateral x-axis.

After the same fiducial segment 64*f* is transfused to fiducial structure 86*f* at nip roller 72, the transfused fiducial segment 64*f* then passes imaging sensor 76. Controller assembly 38 may refer to servo coordinate data 126*a* and image 128 to predict the location and dimensions of the image scanned by imaging sensor 76. This is illustrated by predicted image 130 in FIG. 6B (shown with broken lines) having a leading edge 130*a* at time $t_3$, a trailing edge 130*b* at time $t_5$, and lateral edges 130*c* and 130*d*.

Time $t_3$ for leading edge 130*a* is expected to be offset from time $t_1$ for leading edge 128*a* by the expected time required to move fiducial segment 64*f* from imaging sensor 74 to imaging sensor 76, which is based on the process distance between imaging sensors 74 and 76, and the speeds of belt 22 and build platform 80. In other words, the duration 132 between times $t_1$ and $t_3$ is the predicted duration if the movements of belt 22 and build platform 80 are properly synchronized.

The lateral edges 130*c* and 130*d* of image 130 are predicted to have the same locations along the lateral x-axis as lateral edges 128*c* and 128*d* of image 128 based on the mapping from x-axis coordinate data 126*b*. In the shown example, lateral edge 130*c* is at location $x_1$, and lateral edge 130*d* is at location $x_3$, which are offset along the lateral x-axis by the dimensions of fiducial segment 64*f*.

However, as further shown in FIG. 6B, part data 122 includes image 134, which corresponds to an actual scan of the same fiducial segment 64*f* after being pressed onto and transfused to fiducial structure 86*f*. This scan is taken by imaging sensor 76 after the transfusion step performed at nip roller 72. Image 134 includes leading edge 134*a* of the transfused fiducial segment 64*f*, which shows up at time $t_4$, and trailing edge 134*b* of the transfused fiducial segment 64*f*, which shows up at time $t_6$. Moreover, image 134 also includes lateral edge 134*c* at location $x_2$ and lateral edge 134*d* at location $x_4$.

A comparison of images 130 and 134 illustrates the x-y overlay errors that occurred at layer transfusion assembly 20. The y-axis alignment errors can be identified by the differences along the time axis between leading edges 130*a* and 134*a* (i.e., between times $t_3$ and $t_4$), and between trailing edges 130*b* and 134*b* (i.e., between times $t_5$ and $t_6$). These y-axis alignment errors can be due to numerous potential process conditions. For instance, thermal expansion or stretching of belt 22 can result in misalignment drifts along the y-axis over time relative to the encoder for belt 22. This can induce errors in servo coordinate data 126*a* for synchronizing belt 22 and build platform 80.

The x-axis alignment errors can be identified by the differences along the lateral x-axis between lateral edges 130*c* and 134*c* (i.e., between locations $x_1$ and $x_2$), and between lateral edges 130*d* and 134*d* (i.e., between locations $x_3$ and $x_4$). These x-axis alignment errors can be attributed to numerous factors, such as belt jitter, lateral shifts of build platform 80 or build sheets on build platform 80, part creep or deformation in the lateral directions, and the like.

The misalignments between lateral edges 130*d* and 134*d* along the x-axis, and between trailing edges 130*b* and 134*b* along the y-axis correspond to an overhanging ridge of the part material for the printed fiducial structure 86*p*. As mentioned above, after the pressing step at nip roller 72, fiducial portion 64*p* preferably remains in sufficient intimate contact with the underlying build surface 88 to remain adhered to fiducial structure 86*f*, and to cleanly release from belt 22.

Figure 7:
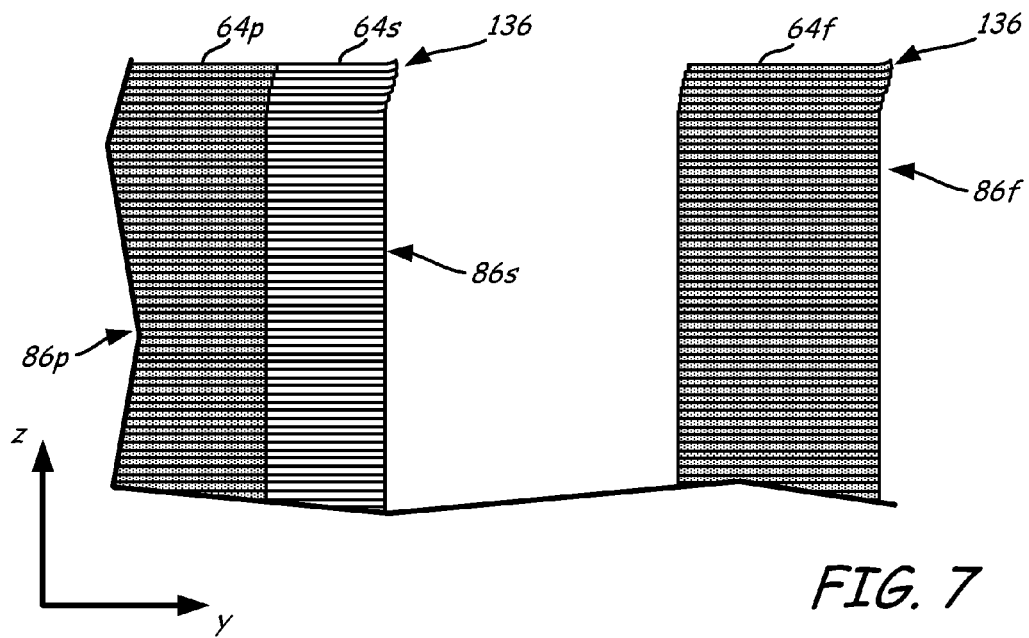
FIG. 7 is a side view of a printed part, illustrating overhanging ridges that can occur due to the x-y overlay errors.

However, at the locations of this overhanging ridge, the part material is not adhered to any underlying build surface 88. As such, as shown in FIG. 7, some of the part material at the overhanging ridge (referred to as overhanging ridge 136) can be pulled upward when releasing from belt 22 at nip roller 72 due to its relatively weaker bond to the printed part 86. This upward pulling of the part material can cause the trailing edges of the printed part 86 to stick up along the z-axis at overhanging ridges 136. If the overhanging ridges 136 are allowed to grow along the z-axis over multiple layers of printed part 86, they can lead to unacceptable part quality and even have an impact the system performance.

Figure 8:
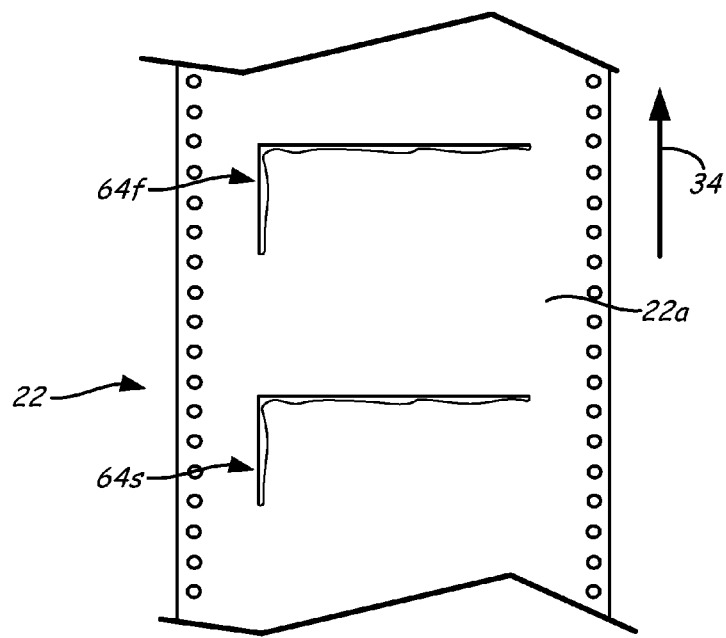
FIG. 8 is a top view of a transfer belt after a transfusion step, illustrating residual amounts of a part material that can also occur due to the x-y overlay errors.

Additionally, as illustrated in FIG. 8, portions of the part material at overhanging ridge 136 may actually remain adhered to belt 22 as residual amounts of fiducial segment 64f and support layer 64s. It has been found that the part and support materials at the peripheral edges of overhanging ridges (e.g., overhanging ridge 136) tend to remain adhered to belt 22 rather than release with the remaining portions of layers 64. As such, in addition to overhanging ridges that can pull up and grow along the z-axis (as shown above in FIG. 7), the x-y overlay errors can also prevent clean and full layer releases from belt 22.

The detection of any residual material remaining on belt 22 has also been found to be useful for detecting x-y overlay errors. As such, in addition to the comparison between layer data 120 and part data 122 from imaging sensors 74 and 76, controller assembly 38 may also (or alternatively) compare layer data 120 to belt data 124 to detect if any residual amounts of fiducial segment 64f remains adhered to front surface 22a of belt 22.

Figure 9A:
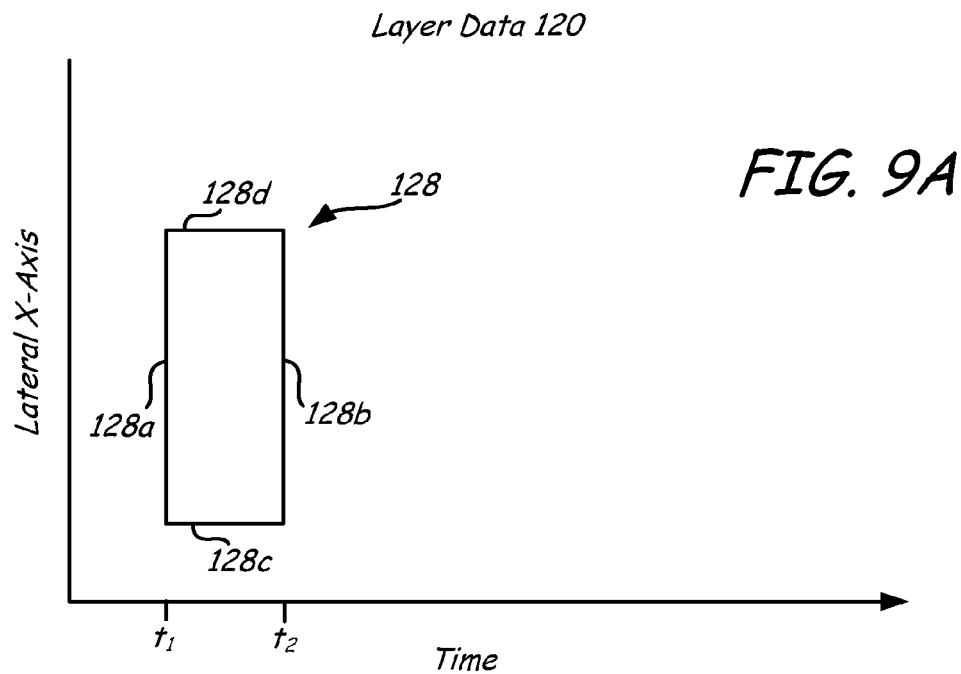
FIGS. 9A and 9B are graphical plots of scanned images, illustrating a second embodied technique for comparing the scans to detect x-y overlay errors.
Figure 9B:
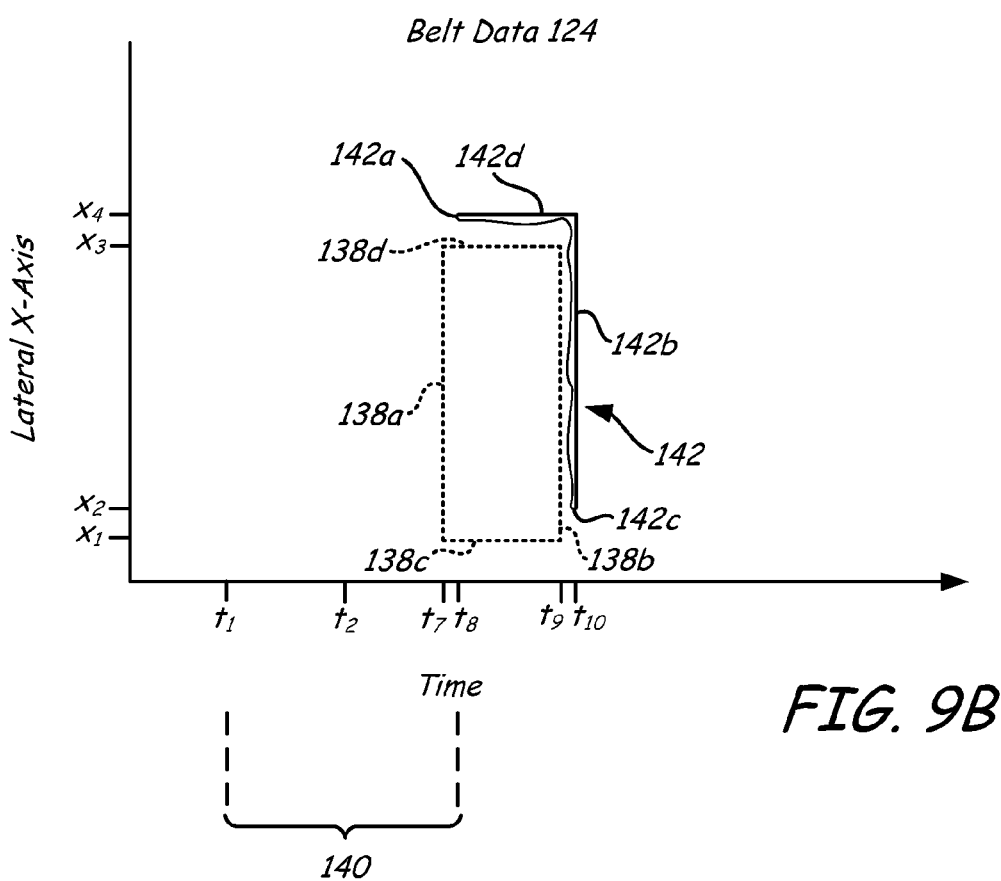

FIGS. 9A and 9B illustrate an example comparison of layer data 120 and belt data 124 that controller assembly 38 may perform to further detect any x-y overlay errors. It is understood that the plots in FIGS. 9A and 9B are also merely illustrative, and controller assembly 38 can perform the comparison on a computational basis.

FIG. 9A corresponds to the same image 128 as shown above in FIG. 6A, which is taken by imaging sensor 74 prior to the transfusion step. In comparison, after the transfusion step, belt 22 continues to rotate in the direction of arrow 34 past imaging sensor 78, which is downstream from nip roller 72. Controller assembly 38 may then use the rotational speed of belt 22 and image 128 to predict the location and dimensions of the image scanned by imaging sensor 78. This is illustrated by predicted image 138 in FIG. 9B (shown with broken lines) having a leading edge 138a at time $t_7$, a trailing edge 138b at time $t_9$, and lateral edges 138c and 138d.

Time $t_7$ for leading edge 138a is expected to be offset from time $t_1$ for leading edge 128a by the expected time required for the same location of belt 22 to move from imaging sensor 74 to imaging sensor 78, which is based on the process distance between imaging sensors 74 and 78, and the rotational speed of belt 22. In other words, the duration 140 between times $t_1$ and $t_7$ is the predicted duration if the rotational rate of belt 22 is properly calibrated relative to its encoder.

The lateral edges 138c and 138d of image 138 are predicted to have the same locations along the lateral x-axis as lateral edges 128c and 128d of image 128. In the shown example, lateral edge 138c is at location $x_1$, and lateral edge 138d is at location $x_3$, which are offset along the lateral x-axis by the dimensions of fiducial segment 64f.

Ideally, if no x-y overlay errors exist and fiducial segment 64f cleanly released from belt 22, imaging sensor 78 would not scan any residual amounts of the part material, or will only scan symmetric amounts of the part material (e.g., due to other possible non-overlay issues). However, in the example shown in FIGS. 8 and 9B, the fiducial segment 64f of the transfused layer 64 exhibits an x-y overlay error such the non-symmetrical part material at the peripheral edges of overhanging ridge 136 remain adhered to belt 22 after the transfusion step. As these peripheral edges move past imaging sensor 78, imaging sensor 78 generates and transmits belt data 124.

As further shown in FIG. 9B, belt data 124 includes image 142, which corresponds to the non-symmetrical residual amounts of the part material from fiducial segment 64f that remained adhered to belt 22. Image 142 includes leading edge 142a, which shows up at time $t_8$, and trailing edge 142b, which shows up at time $t_{10}$. Moreover, image 142 also includes lateral edge 142c at location $x_2$ and lateral edge 142d at location $x_4$.

A comparison of images 138 and 142 further illustrates the x-y overlay errors that occurred at layer transfusion assembly 20. The y-axis alignment errors can primarily be identified by the differences along the time axis between trailing edges 138b and 142b (i.e., between times $t_9$ and $t_{10}$). Similarly, the x-axis alignment errors can primarily be identified by differences along the lateral x-axis between lateral edges 138d and 142d (i.e., between locations $x_3$ and $x_4$). As can be appreciated, having portions of the part materials 66p and/or the support materials 66s remaining adhered to belt 22 after the transfusion step can detrimentally affect the printing accuracies.

Accordingly, based on the comparisons between layer data 120 and part data 122 (as shown in FIGS. 6A and 6B) and/or between layer data 120 and belt data 124 (as shown in FIGS. 9A and 9B), controller assembly 38 may then compensate for the detected x-y overlay errors to reduce or eliminate the x-y overlay errors for the successive layers 64.

In some embodiments, the compensation may be performed by updating calibration parameters of system 10. For instance, controller assembly 38 may update servo coordinate data 126a and/or x-axis coordinate data 126b to position build platform 80 at the correction location in the x-y build plane during a printing operation. This calibration update may be performed prior to each printing operation, and optionally performed one or more times during short pauses in the printing operation.

Figure 10:
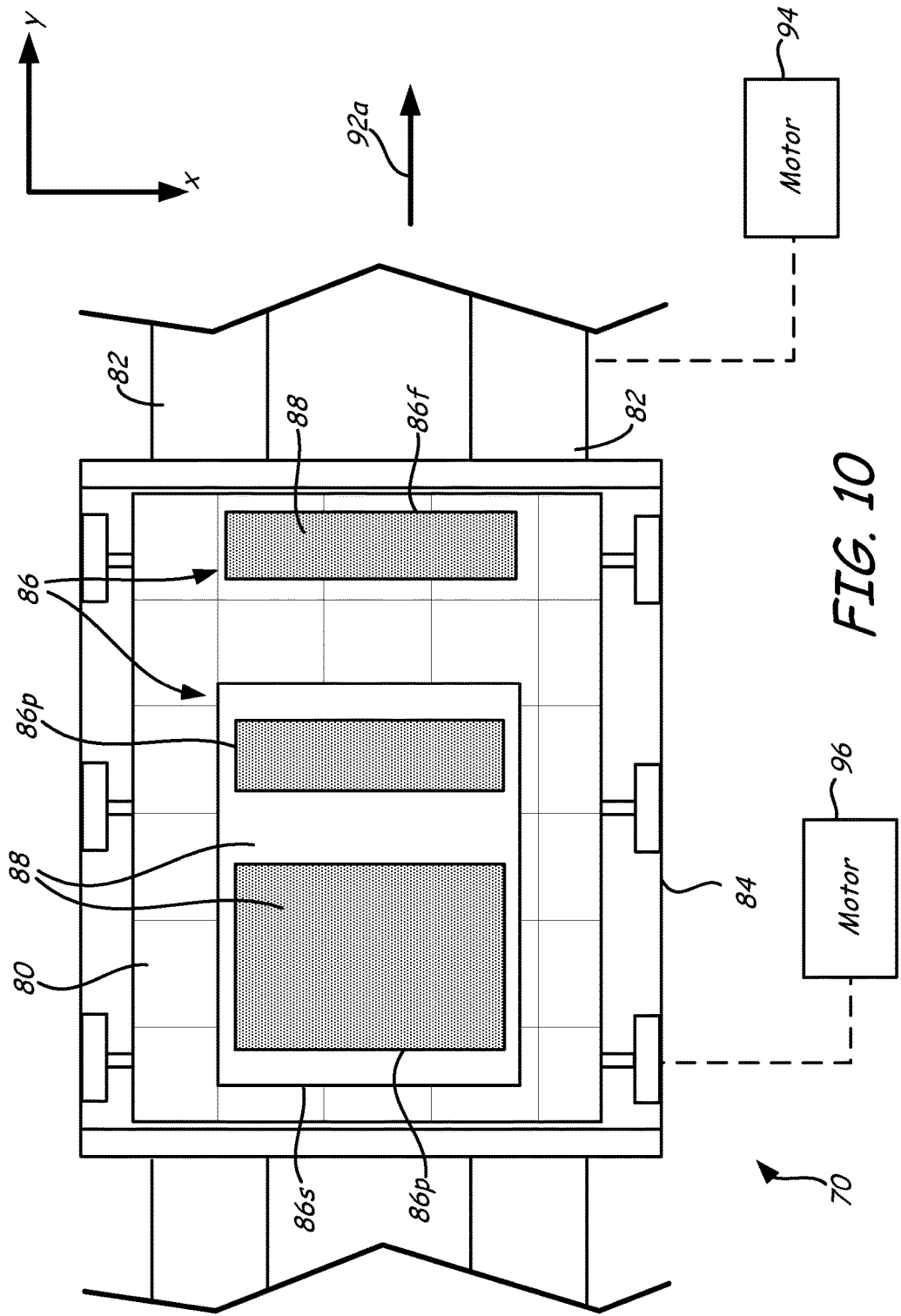
FIG. 10 is a top view of a platen assembly, illustrating a compensation technique for reducing the x-y overlay errors.

Alternatively, controller assembly 38 compensates for the detected x-y overlay errors through the use of a feedback control to provide real-time positioning updates. For example, as shown in FIG. 10, in order to compensate for the y-axis alignments errors between leading edges 130a and 134a and between trailing edges 130b and 134b (shown above in FIGS. 6A and 6B), controller assembly 38 may update servo coordinate data 126a to modify the speed and timing sequence of y-stage gantry 82 (via motor 94).

This preferably modifies the movement speed and timing of build platform 80, x-stage gantry 84, and 3D part 86 such that the leading edges 134a and trailing edges 134b for the images 134 of the next successive layers 64 shift to times $t_3$ and $t_5$ (corresponding to the y-axis locations of leading edge 130a and trailing edge 130b of predicted image 130). In other words, this modification aligns build surface 88 with the next successive layer 64 along the y-axis process direction of arrow 92a.

Additionally, in order to compensate for the x-axis alignments errors between lateral edges 130c and 134d and between lateral edges 130d and 134d (shown above in FIG. 6), controller assembly 38 may update x-axis coordinate data 126b to adjust the position of build platform 80 along the lateral x-axis. In particular, this causes x-stage gantry 84 to move build platform 80 and 3D part 86 along the lateral x-axis (via motor 96). This accordingly repositions the build surface 88 of 3D part 86 along the x-axis relative to belt 22 such that the lateral edges 134c and 134d for the images 134 of the next successive layers 64 are positioned at locations $x_1$ and $x_3$ (corresponding to the x-axis locations of lateral edges 130c and 130d of predicted image 130).

The next successive layer 64 may then be transfused to build surface 88 of 3D part 86 with reduced or eliminated x-y overlay errors. As can be appreciated, the x-y adjustments to build platform 80 need to be accomplished within one-layer cycle (i.e., before the next layer 64 is pressed at nip roller 72. Otherwise, the movement of build platform 80 during the pressing at nip roller 72 may reduce printing accuracies.

Accordingly, controller assembly 38 preferably receives the scanned images from imaging sensors 74, 76, and/or 78, detects any x-y overlay errors, and adjust the position of build platform 80 in the x-y build plane within one-layer cycle. This feedback control may then be performed again for each layer, if desired, for continuous alignment updates. Alternatively, in some embodiments, the alignment update may be performed after given intervals occur to reduce processing demands on controller assembly 38.

Figure 11:
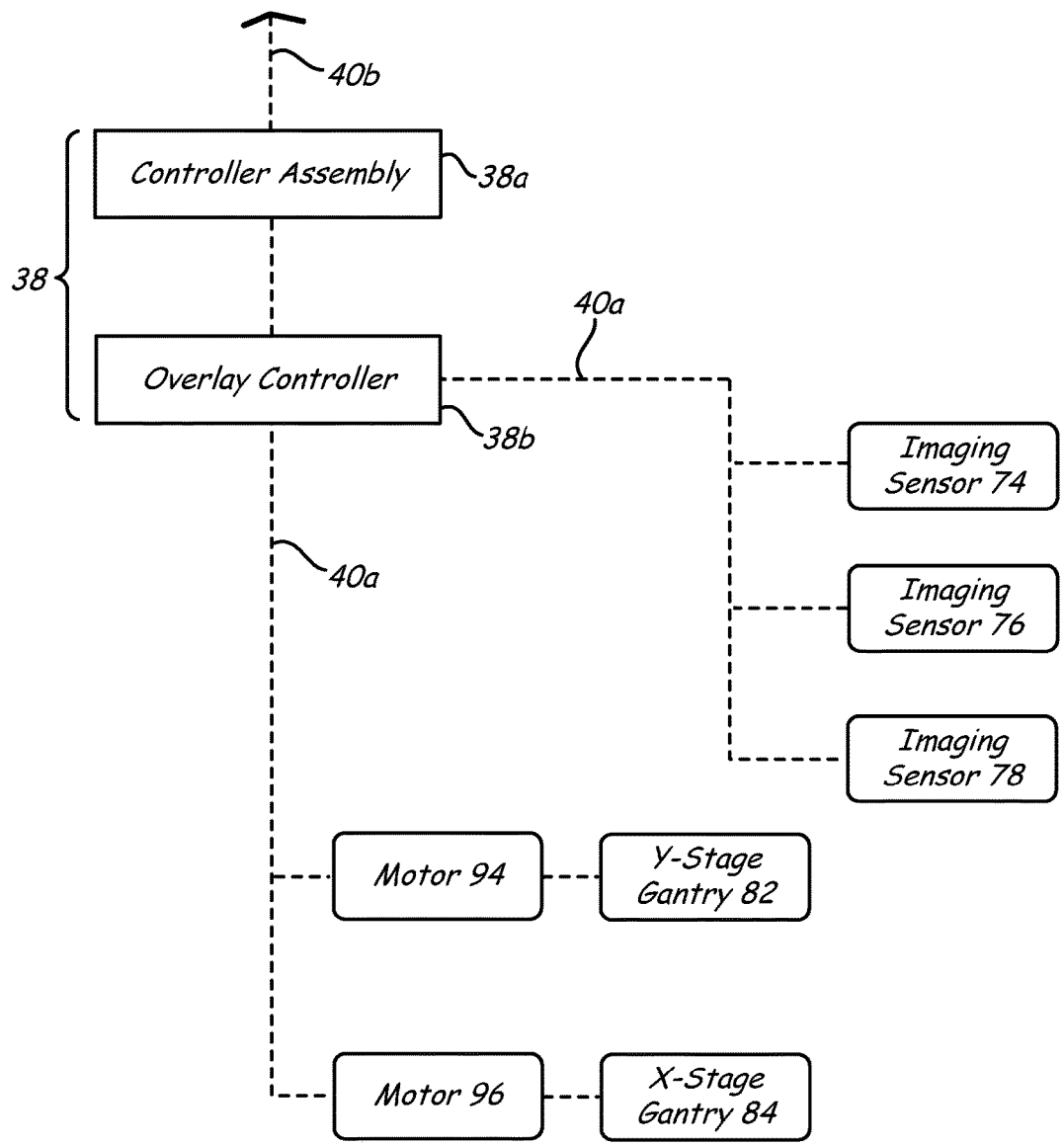
FIG. 11 is a schematic illustration of an alternative arrangement for the controller assembly of the system.

As mentioned above, controller assembly 38 may include one or more computer-based systems configured to operate the components of system 10. FIG. 11 illustrates an embodiment in which controller assembly 38 includes a primary controller assembly 38a and a secondary, overlay controller 38b. In this embodiment, overlay controller 38b may be installed as an independent and stand-alone controller to function with imaging sensors 74, 76, and 78.

During operation, controller assembly 38a operates system 10 as discussed above, where signals to motor 94 and/or y-stage gantry 82 are passed through overlay controller 38b. In this case, however, the scanned images from imaging sensors 74, 76, and 78 are transmitted to overlay controller 38b, allowing overlay controller 38b to compare the images to detect any x-y overlay errors.

If any x-y overlay error is detected, overlay controller 38b may then commandeer one or both of y-stage gantry 82 and x-stage gantry 84 to reduce or eliminate the x-y overlay error for the next successive layer 64, as discussed above. After the realignment is made, overlay controller 38b may then relinquish control of y-stage gantry 82 to controller assembly 38a until a subsequent realignment is required. This embodiment is beneficial for use with an existing system 10, where overlay controller 38b and imaging sensors 74, 76, and 78 may be installed as an upgrade, for example, with minimal impact on the remaining components of system 10.

Although the present disclosure has been described with reference to preferred embodiments, workers skilled in the art will recognize that changes may be made in form and detail without departing from the spirit and scope of the disclosure.

The invention claimed is:

1. An additive manufacturing system for printing a three-dimensional part, the additive manufacturing system comprising:
one or more imaging engines configured to develop layers of the three-dimensional part;
a build platform;
one or more gantry mechanisms configured to move the build platform;
a rotatable transfer medium configured to receive the developed layers from the one or more imaging engines, and to transfer the developed layers onto intermediate build surfaces of the three-dimensional part on the build platform in a layer-by-layer manner;
one or more imaging sensors configured to scan the developed layers on the rotatable transfer medium and on the three-dimensional part, and to transmit data relating to the scans; and
a controller assembly configured to receive the transmitted data from the one or more imaging sensors, to detect overlay errors from the scans, and to adjust the one or more gantry mechanisms to reduce the overlay errors.

2. The additive manufacturing system of claim 1, wherein at least one of the imaging sensors is located upstream along the rotatable transfer belt relative to a transfer location of the developed layers onto the intermediate build surfaces.

3. The additive manufacturing system of claim 2, wherein at least a second of the imaging sensors is located downstream from the transfer location along a direction of movement of the build platform.

4. The additive manufacturing system of claim 2, wherein at least a second of the imaging sensors is located downstream from the transfer location along the rotatable transfer medium.

5. The additive manufacturing system of claim 1, wherein the one or more imaging sensors comprise at least one line scan camera.

6. The additive manufacturing system of claim 1, wherein the rotatable transfer medium comprises a rotatable transfer belt, wherein the additive manufacturing system further comprises a nip roller engaged with the rotatable transfer belt, and wherein the one or more imaging sensors configured to scan the developed layers on the rotatable transfer belt at an engagement location of the nip roller and the rotatable transfer belt.

7. The additive manufacturing system of claim 1, wherein the one or more gantry mechanisms comprise:
a first gantry mechanism configured to move the build platform in a process direction; and
a second gantry mechanism configured to move the build platform in a second direction that is perpendicular to the process direction.

* * * * *